United States Patent [19]

Somerville

[11] 4,327,473
[45] May 4, 1982

[54] METHOD OF APPLYING A CRACK ARRESTOR

[75] Inventor: Francis S. Somerville, Calgary, Canada

[73] Assignee: Northern Border Pipeline Company, Kansas City, Mo.

[21] Appl. No.: 4,884

[22] Filed: Jan. 19, 1979

Related U.S. Application Data

[62] Division of Ser. No. 733,882, Oct. 19, 1976, Pat. No. 4,148,127.

[30] Foreign Application Priority Data

Oct. 20, 1975 [CA] Canada .................................. 238126

[51] Int. Cl.$^3$ ............................................. B23P 11/02
[52] U.S. Cl. .................................... 29/447; 138/155; 138/172
[58] Field of Search ......................... 29/DIG. 45, 447; 138/172, 174, 155; 405/168

[56] References Cited

U.S. PATENT DOCUMENTS

| | | | |
|---|---|---|---|
| 3,349,807 | 10/1967 | Penman | 138/172 |
| 3,377,757 | 4/1968 | Magers | 138/172 X |
| 3,747,356 | 7/1973 | Lockridge et al. | 138/172 X |
| 3,870,350 | 3/1975 | Loncaric | 138/155 X |
| 4,001,054 | 1/1977 | Makepeace | 138/155 X |

FOREIGN PATENT DOCUMENTS

| | | | |
|---|---|---|---|
| 260898 | 11/1926 | United Kingdom | 138/172 |
| 263083 | 3/1927 | United Kingdom | 138/172 |

*Primary Examiner*—Charlie T. Moon
*Attorney, Agent, or Firm*—Kenyon & Kenyon

[57] ABSTRACT

A method of applying a crack arrestor to a pipe section by heating and allowing the arrestor to cool and compress a layer of corrosion resistant material in the position it will occupy along the pipe length.

1 Claim, 16 Drawing Figures

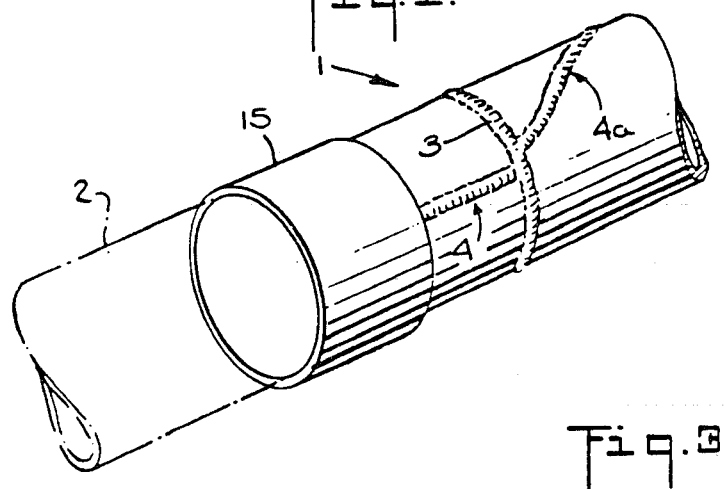
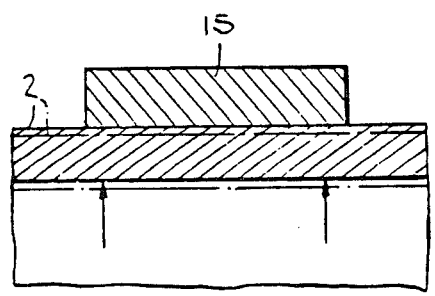
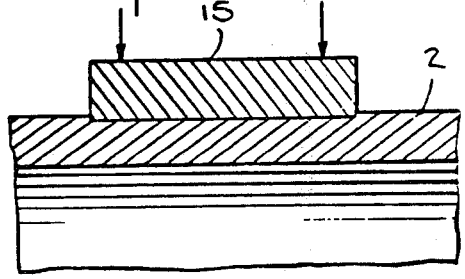
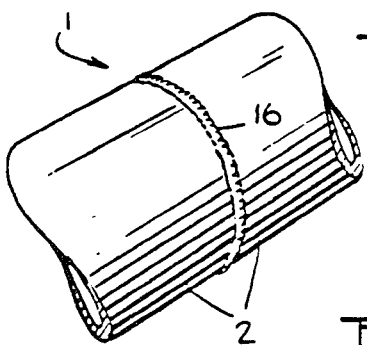
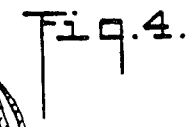
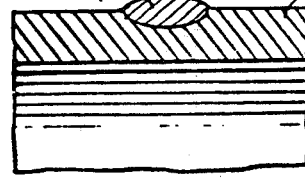
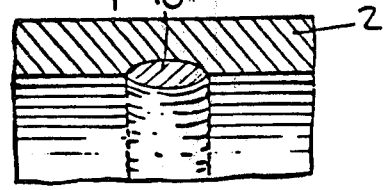
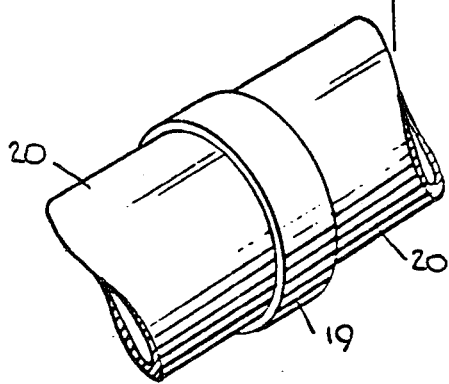
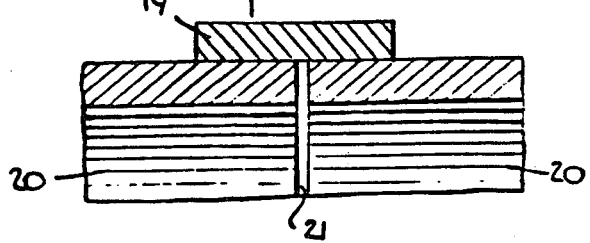

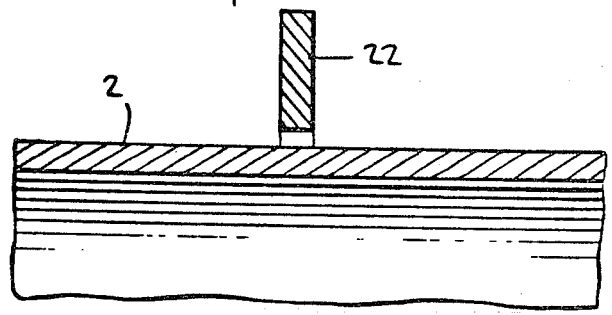
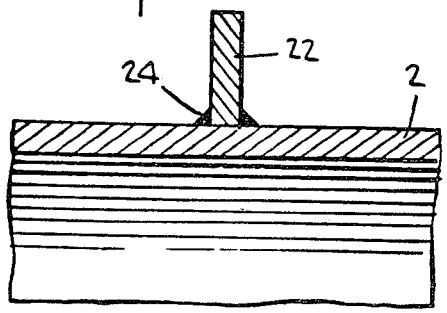
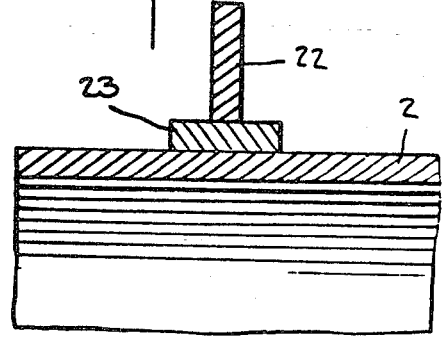
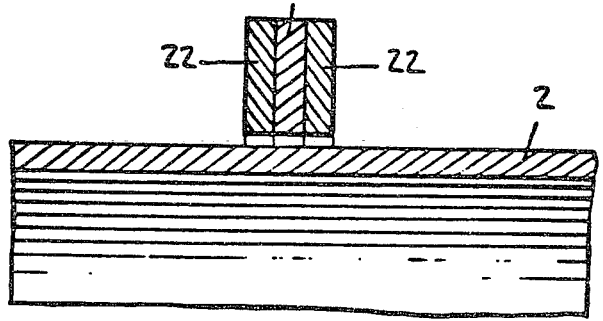

METHOD OF APPLYING A CRACK ARRESTOR

This is a division of application Ser. No. 733,882 filed Oct. 19, 1976, now U.S. Pat. No. 4,148,127, issued Apr. 10, 1979.

This invention relates to means for arresting longitudinal propagation of a crack in pipelines carrying natural gas or highly volatile normally gaseous liquids or combinations thereof, and to methods for applying said crack arrestor means to pipelines.

BACKGROUND OF THE INVENTION

It has been determined that pipelines carrying fluids such as natural gas, liquid gas, or liquid-gas phases are subject to splitting or cracking as a result of both external and internal events that locally stress the wall of the pipe beyond the stress level sustainable by the material of the pipe. If the split or crack is of any significant length, it will not merely remain static but it will propagate longitudinally in the pipeline at high velocity in both directions away from the initial split. For certain temperature conditions, the crack may propagate along the pipeline made of material such as mild steel, as a ductile crack opening the pipe up longitudinally generally along a line at the top of the pipeline while under other temperature conditions, the crack may propagate as a brittle crack as it travels along the pipeline. In contrast to the ductile crack propagation wherein the pipe actually opens up, the brittle crack appears simply as a crack or a network of cracks without significant pipe distortion. The velocity of a ductile crack may vary from about 200 to about 1,000 feet per second while the brittle crack will propagate at greater speeds, e.g. of the order of 1,300 to 3,000 feet per second. In both cases, the speed of propagation unless such propagation is in someway inhibited, the speed of propagation is greater than or the same as the velocity of the critical driving pressure wave of the gaseous or volatile contents of the pipeline, so that in the vicinity of the tip or head of the crack, the internal pressure is sufficient to continue crack propagation until in some manner the fracture is arrested. While the problem of pipeline fracture propagation is not as significant in smaller diameter pipelines carrying lower pressure gas under moderate climatic conditions, the problem becomes a serious one in connection with larger diameter pipelines carrying high pressure gaseous fluid rich in hydrocarbons in extreme climatic conditions and environmental factors which all may be present in, for example, piping natural gas and hydrocarbons from the Arctic.

Regardless of the care taken for obtaining the desired pipe specifications including built-in safety margins to handle the anticipated operating conditions of the pipeline, pipeline cracking, even possibly brittle cracking, cannot be ruled out. Moreover, since pipelines may be employed for transporting natural gas and the like from remote areas such as the Arctic, the damage of fracture propagation over long lengths of pipeline in remote and inaccessible areas is apparent. It is therefore necessary to provide for the arresting of any propagating crack before such crack can propagate over any extensive distance and to achieve such crack arrest in an economical way.

SUMMARY OF THE INVENTION

In approaching the problem of crack arrest, the selection of the specifications of the pipe to be used for the pipeline is made to provide a tough ductile pipe which will substantially preclude brittle fracture and then means are provided at intervals along the pipeline to alter the resistance of the pipeline to the tendency to open up along a line under ductile crack propagation.

For a better understanding of the invention, it may be explained that, whether initiated by internal or external events, it has been determined that a ductile crack involves the opening up of the pipe to an extent of several inches, perhaps 2 to 4 inches within a foot of the crack tip in a 48″ pipe and as the pipe opens, stress is created and concentrated in the unopened pipe immediately ahead of the crack, perhaps extending several feet ahead the tip of the crack. This stress concentration exceeds the normal stress level in the pipe and the crack continues to propagate including across the normal welds joining the pipe in end-to-end relation. Because the velocity of propagation of the crack is greater than or equal to the velocity of the critical crack driving pressure of the gas as it escapes from the previously cracked pipe, the crack is driven on and unless it can be stopped or slowed so that the pressure at the tip of the crack is less than the critical crack driving pressure, it will continue to propagate.

It has been determined that if a pipe section presenting a wall capable of withstanding, or dissipating the concentrated stress wave immediately ahead of the propagating ductile crack, or a pipe section having any combination of such properties, is interposed in the path of the crack, the crack can be arrested and/or slowed and subsequently arrested.

It has also been determined that such a pipe section may also be capable of arresting brittle crack propagation should by chance such crack propagation be initiated.

Therefore, a crack arrestor may comprise a pipe section or pipe wall element located along the pipeline having stress resisting characteristics differing from the adjoining pipe length whereby the stress concentration wave ahead of the tip of any propagating ductile crack will at least be dissipated to a lower stress concentration as it attempts to propagate therethrough.

Crack arrestor sections which include or comprise a standard pipe section having an encircling band to restrain the encircled pipe wall from opening up have been disclosed, for example, in U.S. Pat. Nos. 3,870,350 and 3,349,807. Such an encircling band has been applied by welding semicircular segments or part sections of metal strapping or pipe around a standard pipe section. Other types of crack arrestors, consisting of heavy wall sections of pipe and/or oriented metal grain structures have been proposed, for example, in U.S. Pat. Nos. 3,096,105 and 3,698,746.

In prior art crack arrestors, several disadvantages may be encountered. First, a completely tight seal between the outer pipe wall and the inner surface of the restraining bands may be extremely difficult to obtain. Second, the crack arrestors may require extensive welding or mechanical operations to be performed in the field, which is particularly expensive and difficult under Arctic conditions. Moreover, those crack arrestor means previously known which call for filet welding the arrestor to the pipe may present disadvantages in that filet welds may even promote cracks in the pipeline.

A further type of crack arrestor, disclosed in an Apr. 10, 1974 Bulletin of the Research Laboratory, United States Steel Corporation, (a copy is submitted to the Patent Office herewith) constitutes a brittle girth weld joining segments of pipe in end-to-end relation. This type of crack arrestor, however, presents a risk that the brittle girth weld will fail under normal operating conditions.

According to one aspect of the invention, the inner pipe section may be expanded hydraulically or mechanically into engagement with a surrounding ring or outer pipe section. During the manufacture of some pipe, the formed and welded pipe is expanded approximately one and one half percent (1½%) in diameter to increase the yield strength of the pipe and to provide dimensional control. According to the invention, a cylinder of welded pipe or other suitable material is placed over the unexpanded pipe length, such that the subsequent expansion of the inner pipe provides a close fit of the outer pipe section over the pipe. Among the advantages of the invention are that the tight fit between the pipe and cylinder may reduce the need for corrosion protection of the potential gap between the two sections. In addition, the dimensions and selection of the pipe and cylinder material, and the amount of expansion, can be selectively controlled to generate stress conditions in the pipe which are favorable to crack arrest.

Alternatively, according to the invention, the encircling band may be applied by explosive welding. The explosively welded encircling band may act as a sleeve or as a collar joining two sections of pipe. As a further alternative, the encircling band may be applied in a heated, expanded condition and allowed to cool and contract to a tight fit over the pipe.

In another aspect of the invention, a ring or disc having an inside diameter the same or slightly larger than the outside diameter of the pipe, and having a radial dimension greater than its thickness dimension, comprises a crack arrestor.

In another aspect of the invention, e.g. the dissipation of the stress concentration, the pipe arrestor section may include or comprise a pipeline segment or section which while exhibiting sufficient stress resistance or hoop strength for handling normal pipeline pressure will have a degree of brittleness such that the arrival of the stress wave in advance of a propagating ductile crack will produce multiple cracking or even complete peripheral rupture of such segment or section and the stress concentration ahead of the individual cracks of the branched cracks or at the far side of the peripherally cracked segment will drop to within the acceptable limits which the wall of the next successive pipe section can safely withstand to achieve crack arrest.

Such a stress concentration distributing or dissipating pipe segment may comprise a peripheral brittle weld either external or internal intermediate the ends of a pipe section. Alternately, it may comprise a brittle collar bridging spaced pipe ends and exposed to the interior of the pipe line, although such collar could also be chosen to exhibit sufficient increased stress resisting capabilities to arrest the crack without fracturing. In either case the collar may be explosively welded to the adjoining pipe sections.

These and other objects and features will become apparent from the following detailed description taken in conjunction with the accompanying drawings.

BRIEF DESCRIPTION OF THE DRAWINGS

FIG. 1 illustrates the application of an encircling sleeve applied to a pipe for the purpose of altering the stress concentration resistance of the encircled pipe.

FIG. 2 is a longitudinal sectional view illustrating the manner in which the pipe may be expanded into contact with the encircling sleeve as one method of obtaining intimate contact between the pipe and sleeve.

FIG. 3 is a view similar to FIG. 2 but showing the application of the sleeve as produced by explosive welding for intimate contact with the encircled pipe.

FIG. 4 is a diagrammatic perspective view illustrating the application of a brittle weld to provide an altered segment of stress concentration resistance to effect dispersion of the stress concentration circumferentially in accordance with another aspect of the invention.

FIG. 5 is a broken away longitudinal section showing the weld as occurring as an external weld intermediate the length of a pipe section.

FIG. 6 is a view similar to FIG. 9, but showing the weld internally rather than externally.

FIG. 7 is a perspective view illustrating the application of an explosively welded band bridging two separate pipe sections again to provide an altered pipe segment having a different stress concentration resistance to effect either peripheral distribution of the stress concentration preceding the tip of a propagating ductile fracture, or to increase stress concentration resistance depending on the specification of the welded band.

FIG. 8 is a fragmentary longitudinal sectional view of the explosively welded band of FIG. 7.

FIG. 13 is a broken away longitudinal section showing the ring or disc loosely fitted over the pipe.

FIG. 14 is a view similar to FIG. 13, but showing the ring or disc joined by welding or some other means to the pipe.

FIG. 15 is a view similar to FIGS. 13 and 14, but showing the ring or disc fitted to the pipe with a band.

FIG. 16 is a broken away longitudinal section showing the application of a series of rings or discs to a pipe section to increase stress concentration resistance.

DETAILED DESCRIPTION OF THE DRAWINGS

Figure 9:
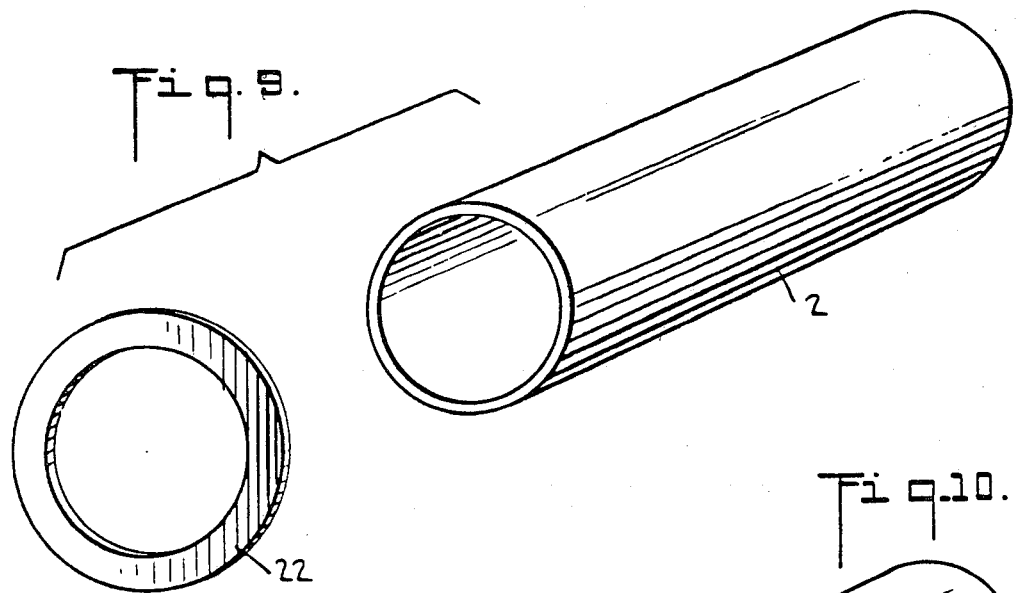
FIGS. 9 and 10 are perspective views illustrating the application of a ring or disc to a pipe section to increase stress concentration resistance.
Figure 10:
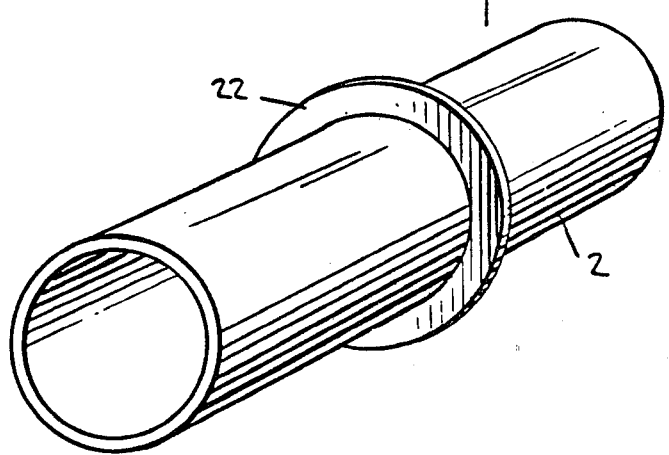

With reference to FIG. 1, there is shown a pipeline generally designated at 1 made up of pipe sections 2 which are welded in end-to-end relation as at 3. Such pipe sections are normally formed of steel although they may be of other metals such as aluminum. The larger diameter pipes with which the present invention is particularly concerned, e.g. in the range of from 36 to 48 inches, have longitudinal or spiral seams which are welded as indicated at 4 and 4a respectively and each pipe section is normally 40 feet in length, small diameter pipes may be seamless.

FIG. 1 illustrates the application of a band generally designated at 15 applied to one of the pipe sections 2 to alter the stress concentration resistance of the encircled wall portion of the pipe.

The specification of the pipe section 2 is selected to provide a degree of ductility in the pipeline at the operating conditions to which the pipeline may be subjected. In the case of a pipeline for delivering natural gas from the Arctic, the selection of the steel specifications will be such as to provide under Arctic operating conditions, e.g. at a temperature below the perma frost melting temperature, i.e. at a temperature below 32 degrees F., a measure of ductility in the pipeline so that the nature of any crack which may develop as a result of any abnormal external or internal effect will be a ductile crack which will tend to open up the pipe along a line as it propagates along the pipeline.

It will be appreciated as explained that as the concentrated stress wave ahead of the tip of the crack reaches the pipe segment encircled by the band 15, it will see a pipe wall segment which is constrained against opening up. That is, the pipe wall segment within the band 15 has had its stress resistance characteristic altered by the encircling band so as to increase its resistance to opening up and it has found that with encircling band formed for example, of a segment of standard pipe section applied as illustrated in FIG. 1, the resistance to opening up is sufficient to initially slow and then stop the propagating crack within the length of the encircling band. As explained, if the propagation velocity or rate of the propagating crack is impeded or slowed, the internal gas pressure will progressively lower until there is not sufficient stress to drive the crack.

In most instances an encircling band 15 will be sufficient to arrest ductile crack propagation, although as hereinafter further explained, such band may be employed in conjunction with other fracture arrest mechanisms.

While the specifications of the pipeline are chosen to essentially preclude brittle cracking, circumstances may occur which render a portion of the pipeline brittle. Again, since the band 15 is an encircling reinforcement adding to the strength of the underlying pipe wall throughout its periphery, the band also has been found to be effective as a means of arresting brittle crack propagation.

It will be understood that while the band may have the same specification as the standard pipe section, the actual specifications will be determined by the actual operating conditions of the specific pipeline section and the manner in which the band is applied.

FIG. 1 illustrates a band 15 which itself is a complete circle. This band 15 may be sleeved onto a pipe section to provide the encircled pipe wall segment which has by virtue of the encircling band, an increased stress concentration resistance. There are several ways in which the band 15 may be made to have a tight or snug fit with the encircled pipeline section 2. For example, the band 15 may be heated and expanded and applied over the pipeline section and allowed to cool. Alternatively, the band 15 may initially have a loose fit around the pipe section 2 and the pipe section 2 may be expanded outwardly as illustrated in FIG. 2 either under hydraulic pressure or by suitable expanding mechanical shoes (not shown). Alternatively, the band may be a band 15 which is applied snugly about the pipe section 2 by means of explosive welding which is diagrammatically illustrated in FIG. 3.

The arrangements in FIGS. 1 to 3 inclusive, comprise means for altering the capability of a segment of a pipe section wall to increase its resistance to opening up by the concentrated stress wave immediately ahead of the propagating ductile crack tip, by virtue of the restriction of the pipe segment to open up and/or the reduction of the stress level of the pipe segment due to the band application (the latter condition also increasing in the resistance of such wall segment to fracturing under brittle crack condition propagation), while FIGS. 4 to 6 inclusive illustrate means for dissipating or distributing the concentrated stress wave immediately ahead of the tip of a propagating ductile crack, so that the wall of the subsequent pipe section will inherently without further assistance have sufficient stress resistance capability to preclude further crack propagation.

The stress distributing or dissipating means comprises a brittle weld 16 as illustrated in FIGS. 4 and 5. This brittle weld will have sufficient resistance to rupture under normal pipe operating conditions, but under the dynamic loading suddenly imposed by the highly concentrated stress preceding the tip of a propagating ductile crack, it will fracture peripherally, distributing such stress concentration peripherally so that no one point of the next succeeding pipe section 2 will be subjected to a stress concentration above a level it cannot safely sustain. This effect may be achieved by the provision of an external brittle weld 16, FIG. 5, or an internal brittle weld 18, FIG. 6.

FIG. 7 illustrates the use of a band 19 to bridge gapped pipe sections 20. The band 19 may be secured to the pipe sections 20 by explosive welding and may be exposed to the internal pressure of the pipeline via the gap 21. When the travelling stress concentration wave immediately ahead of the tip of a propagating ductile crack reaches the gap 21, it is forced to traverse the gap through the band 19 which may be selected to have a degree of brittleness which will cause it to fracture or branch the single travelling crack peripherally around at the gap between the pipes 20, and there will be no point of stress concentration sufficient to overcome the inherent resistance of the subsequent pipe section to cause such pipe section to open up.

It will also be understood that band 19 may be selected to have a crack propagation resistance greater than pipes 20 to effect crack arrest in the same manner as band 15.

FIGS. 9 through 12 illustrate the use of a ring or disc 22 as a means of providing for crack arrest. The crack arrestor consists of a ring or disc having an inside diameter the same or slightly larger than the outside diameter of the pipe, and having a radial dimension greater than the thickness dimension.

Although FIG. 13 shows the disc having some clearance between itself and the pipe wall, it can be more tightly fitting as shown in FIG. 14, filet welded 24 either intermittently or continually as shown in FIG. 14, or placed over the pipe in a loose manner and fitted to the pipe with bands 23 such as shown in FIG. 15. Another configuration is a series of these discs 22 as shown in FIG. 16, either loosely fitted as shown or joined by welding or some other means.

Figure 11:
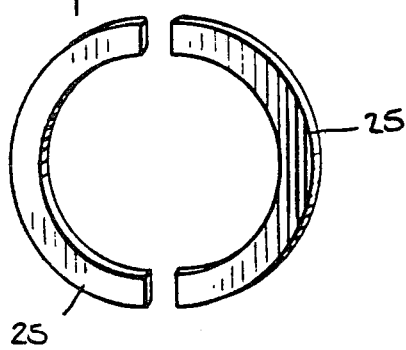
FIGS. 11 and 12 are perspective views illustrating the application of a ring or disc formed from two halves to a pipe section to increase stress concentration resistance.
Figure 12:
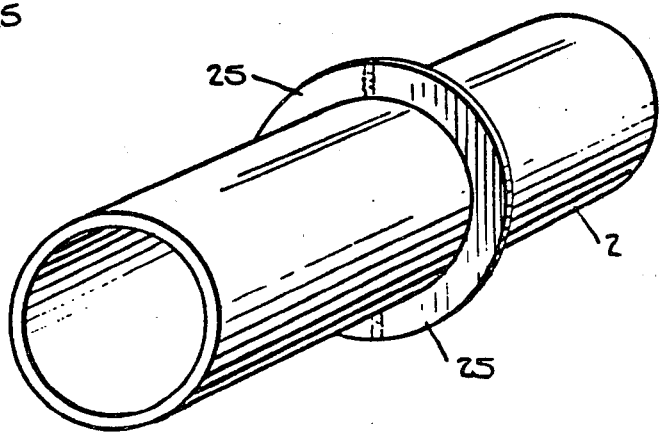

It is possible to place discs of this type around a pipe section or an in-place pipeline by welding together two halves 25 as shown in FIGS. 11 and 12.

The advantages of this disc crack arrestor are that it is a very economical use of material for providing resistance to flap opening compared to the bands or sleeves heretofore suggested. Additionally, the disc has a stiffness which could prevent the ovaling of the pipe which occurs prior to the arrival of a propagating ductile fracture. The use of a multiple number of discs overcomes the problem of achieving the desired metallurgical properties for crack arrest in a thick section, such as a flange. Also, a loose fitting disc may have desirable properties with respect to the stresses in an operating pipeline, particularly as they relate to bending. Further, the configuration shown in FIGS. 11 and 12 provides for the attachment of a crack arrestor with a minimum amount of welding as compared to a plit sleeve or band.

It will be appreciated that a combination of stress resistance increasing crack arresting means such as illustrated in FIGS. 1 to 3 may be combined with stress concentration distributing or dissipating means such as illustrated in FIGS. 4 to 6 in various combinations.

It will be understood that the standard pipe sections for a pipeline of the type for delivering large volumes of pressure gas will be metal and preferably the bands, e.g. band 15 of FIG. 1 will also be of the corresponding metal. However, such bands of other suitable material such as fiberglass may be employed.

Moreover, the space between the band and the pipe section may be filled with a suitable inert material such as a bituminous compound or the space may be filled with a material such as concrete which will transfer load to the band during crack arrest. Furthermore, certain materials such as polyethylene, may perform both of these functions effectively.

It will be understood that within the teachings of the broad aspects of the invention, various alternative arrangements to those particularly depicted and described may be made, without departing from the spirit of the invention or scope of the appended claims.

What is claimed is:

1. A method of applying a band-type crack arrestor to a pipe section comprising:
    (a) placing corrosion resistant material in a location adapted to contact the outer diameter of said pipe section at the location said arrestor will occupy along the pipe length;
    (b) heating said arrestor to cause expansion of the inner diameter of said arrestor to a value larger than the outer diameter of said pipe section sufficient to enable said arrestor to be placed over the outer surface of said pipe section and a portion of said corrosion resistant material;
    (c) placing said arrestor over the outer surface of said pipe section and a portion of said corrosion resistant material;
    (d) allowing said arrestor to cool until the inner diameter of said arrestor engages the outer diameter of said pipe section and the portion of said corrosion resistant material in a tight fit wherein the said portion of said corrosion resistant material is compressed between said arrestor and said pipe section while said arrestor is in the position it will occupy along the pipe length.

* * * * *